United States Patent
Tsuchiya et al.

(10) Patent No.: US 6,374,191 B1
(45) Date of Patent: Apr. 16, 2002

(54) SELF-CALIBRATING SENSOR

(75) Inventors: Munenori Tsuchiya; Kazuya Yamagishi; Shigemitsu Ogawa, all of Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 0 days.

(21) Appl. No.: 09/294,748

(22) Filed: Apr. 19, 1999

(30) Foreign Application Priority Data

Apr. 20, 1998 (JP) .......................................... 10-109320

(51) Int. Cl.$^7$ ......................... G06F 19/00; G01L 27/00
(52) U.S. Cl. ............................ 702/104; 702/85; 702/98
(58) Field of Search ................................ 702/104, 107, 702/116–117, 85–88, 98–99; 73/1.38, 1.59, 1.88

(56) References Cited

U.S. PATENT DOCUMENTS

| | | | |
|---|---|---|---|
| 4,800,513 A | * 1/1989 | Deutsch | ...................... 702/107 |
| 4,860,232 A | 8/1989 | Lee et al. | |
| 4,951,236 A | 8/1990 | Kawate et al. | |
| 4,982,351 A | 1/1991 | Kawate et al. | |
| 5,000,275 A | * 3/1991 | Bullivant | ................. 177/210 R |
| 5,051,937 A | 9/1991 | Kawate et al. | |
| 5,255,975 A | * 10/1993 | Adams | ......................... 702/99 |
| 5,361,218 A | * 11/1994 | Tripp et al. | .................... 702/88 |
| 5,770,802 A | 6/1998 | Berthold et al. | |

FOREIGN PATENT DOCUMENTS

| | | |
|---|---|---|
| EP | 0245 031 B1 | 7/1993 |
| JP | 62-267636 | 11/1987 |

OTHER PUBLICATIONS

U.S. Patent Application Serial No. 09/290 945 filed Apr. 13, 1999.

* cited by examiner

Primary Examiner—Bryan Bui
(74) Attorney, Agent, or Firm—Flynn, Thiel, Boutell & Tanis, P.C.

(57) ABSTRACT

A self-calibrating sensor includes a sensor element for electrically detecting change in physical amount of a workpiece. A signal output device detects changes of the sensor element to output an electric signal. A processor conducts calibration calculation for the electric signal to adjust to the physical amount of the workpiece. A memory stores calculation results of the processor. The processor includes a calibration value calculating circuit for calculating a calibration value by conducting the calibration calculation based on a predetermined transforming formula and a calibration completion determining circuit for determining whether calculation of the calibration value by the calibration value calculating circuit is completed or not. The presence of the calibration value calculating circuit and the calibration completion determining circuit eliminates the need for connecting to an outside computer through an exclusive line for calculating the calibration value. Accordingly, an exclusive I/O line for calibration work is omitted as compared to conventional self-calibrating sensors.

4 Claims, 9 Drawing Sheets

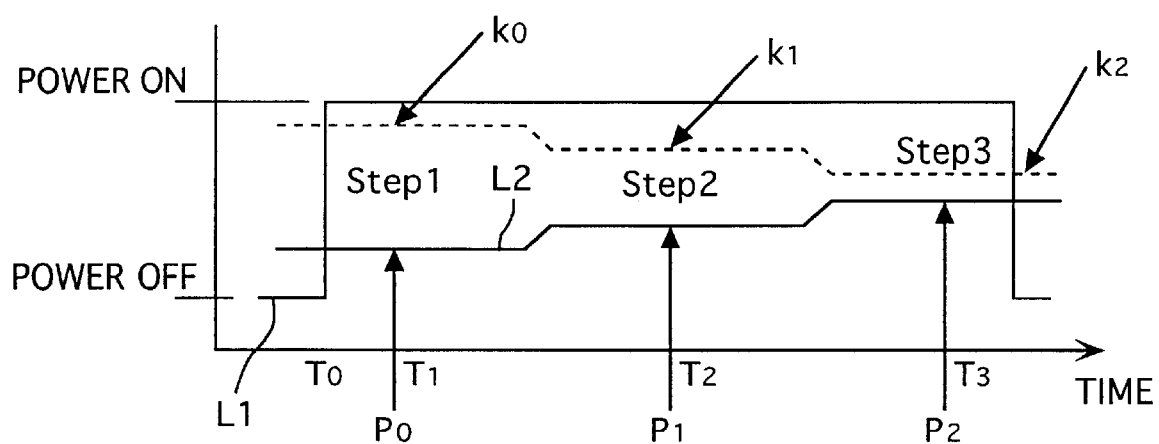
F I G. 8

SELF-CALIBRATING SENSOR

BACKGROUND OF THE INVENTION

1. Field of the Invention

The present invention relates to a self-calibrating sensor having a sensor element for electrically detecting a change in physical amount of a workpiece, a signal output means for detecting the change of the sensor element and outputting an electric signal, a processor for conducting calibration calculation of the electric signal for adjusting to the physical amount of the workpiece, and a memory for storing a calibration value to conduct calibration calculation by the processor. The present invention can be applied to, for example, a self-calibration pressure sensor having ASIC (Application Specific Integrated Circuit) including CPU (Central Processing Unit), in which a deformation of a diaphragm in accordance with pressure change of a workpiece can be detected as a change in electro-capacitance.

2. Description of Related Art

Conventionally, a sensor having a sensor element for electrically detecting a change in a physical amount of a workpiece and a signal output means for detecting the change of the sensor chip and outputting an electric signal is used. For example, an electro-capacitance type sensor having a diaphragm deforming in proportion to a change in pressure of the workpiece, a movable electrode formed on the diaphragm, a fixed electrode opposed to the movable electrode and a signal output means for detecting the change of the sensor element as a change in electro-capacitance between the movable electrode and the fixed electrode to output as a capacitance signal is known as such a sensor.

As a specific example, a pressure detector 90 using an electro-capacitance pressure sensor is shown in FIG. 10.

In the figure, the pressure detector 90 has a base member 91 which has a fitting 92 fixedly screwed to a portion to be detected. The fitting 92 is provided with a pressure inlet 93 to which pressure is introduced from an inside of the portion to be detected. The base member 91 has a greatly enlarged diameter remote from the fitting 92 and a pressure sensor 1 is installed thereon to cover the enlarged opening. A sealing member 94 such as an O-ring is inserted between the pressure sensor 1 and the base member 91 in order to ensure sealability therebetween.

The pressure sensor 1 has a diaphragm 1A on a surface facing the pressure inlet 93, the diaphragm 1A receiving the pressure from the pressure inlet 93 to displace in a direction intersecting the surface. The pressure sensor 1 outputs the displacement of the diaphragm 1A by an internal electrode (not shown) as a change in electro-capacitance.

A processor 5 is mounted on the pressure sensor 1 on a side opposite to the fitting 92. The processor 5 is connected to an electrode of the pressure sensor 1 through a through-hole etc. provided on the pressure sensor 1 to receive a signal showing the change in the electro-capacitance and to output to the outside after amplifying and conducting predetermined arithmetic processing etc.

An output substrate 95 is provided for outputting the signal from the processor 5 to the outside. The processor 5 and the output substrate 95 are wired by wire-bonding etc. and a durable cable 96 is wired to connect the output substrate 95 and the outside.

The base member 91 is covered by a cover member 97, in which all of the pressure sensor 1, the processor 5, the output substrate 95 etc. are accommodated.

The change in the pressure of the workpiece and the capacitance signal do not always linearly correspond within the entire measurement range. Furthermore, slight deviation is caused to respective products when the sensors are mass-produced as consumer products.

Accordingly, calibration work is conventionally conducted for every electro-capacitance pressure sensor so that highly accurate measurement is possible irrespective of the electro-capacitance sensor employed and the measurement range.

However, an outside adjusting apparatus such as potentiometer and trimming apparatus as well as the sensor is necessary for such calibration work and the calibration work is necessary to be done to individual electro-capacitance pressure sensor, thereby largely increasing the cost required for the calibration work after manufacturing the sensor.

In view of the above, a self-calibration pressure sensor is proposed, in which an electro-capacitance pressure sensor has ASIC including CPU which performs the above calibration work.

FIG. 11 shows an example of the conventional self-calibrating sensor.

Self-calibrating sensor 100 has a sensor element 101 including a diaphragm, a signal output means 102 for outputting a change in electro-capacitance in accordance with the pressure change of the sensor element 101 as a capacitance signal S1, a processor 103 for conducting calibration calculation of the capacitance signal S1 to adjust to the pressure of the workpiece, and a memory 104 for storing calibration value for conducting calibration calculation by the processor 103.

When the pressure of the workpiece is measured by the self-calibrating sensor 100, the processor 103 obtains the calibration value for conducting calibration calculation from the memory 104 simultaneously with activation of a power supply unit 105 connected to the self-calibrating sensor 100. Subsequently, the processor 103 conducts calibration calculation of the capacitance signal S1 outputted from the signal output means 102 based on a predetermined calculation formula for outputting signal of pressure converted value P.

When the calibration value of the self-calibrating sensor 100 is calculated, a known calibration pressure $P_0$ is applied to the sensor element 101 and the capacitance signal S1 outputted by the signal output means is detected. The calibration value is set so that the pressure converted value P equals $P_0$ in the calculation formula for obtaining pressure converted value P based on the outputted capacitance signal S1.

For calibrating the self-calibrating sensor 100, a pressure generator 110 is connected to the sensor element 101 of the self-calibrating sensor 100 and the processor 103 of the self-calibrating sensor 100 and a controller (not shown) of the pressure generator 110 are electrically connected to a computer 120, as shown in FIG. 11.

A control signal S2 for outputting calibration pressure $P_0$ is outputted from the computer 120 to the pressure generator 110 and the capacitance signal S1 outputted from the self-calibrating sensor 100 is received by the computer 120 through the serial interface 106. The computer 120 sets the calibration value of the self-calibrating sensor 100 by processing the calibration pressure value $P_0$ based on the outputted control signal S2 and the received capacitance signal S1. The determined calibration value is outputted to the self-calibrating sensor 100 from the computer 120 and is stored in the memory 104 through the serial interface 106.

However, following disadvantage occurs in the conventional self-calibrating sensor.

For outputting the calibration value set by the computer 120 to the self-calibrating sensor 100, an exclusive I/O (input/output) line has to be provided. Specifically, as mentioned above, the serial interface 106 and the like has to be connected to the self-calibrating sensor 100 by a serial and parallel cable for outputting the calibration value, or digital signal has to be coupled to a power supply line to transmit the calibration value.

In the actual pressure measurement, the computer 120 checks whether the calibration value is stored in the memory 104 through the exclusive I/O line to determine which one of the actual measurement and calibration work should be done according to presence of the calibration value. Accordingly, though the aforementioned exclusive I/O line is only used for the calibration work or the check before conducting measurement, the serial interface 106 has to be separately provided and the computer 120 and the self-calibrating sensor 100 has to be connected via a cable.

Therefore, an extra portion is caused to measurement system including the self-calibrating sensor 100 and the computer 120, thereby increasing the cost for structuring the measurement system. Further, since the exclusive serial interface 106 has to be provided to the self-calibrating sensor 100, the production cost for the self-calibrating sensor 100 is also increased.

SUMMARY OF THE INVENTION

An object of the present invention is to provide a self-calibrating sensor having a sensor element for electrically detecting a change in physical amount of a workpiece, a signal output means for detecting the change of the sensor element and outputting an electric signal, a processor for conducting calibration calculation of the electric signal to adjust to the physical amount of the workpiece, and a memory for storing a calibration value for conducting calibration calculation by the processor, in which the exclusive I/O line can be omitted to reduce the production cost and further reduce the cost of the measurement system.

For attaining the aforesaid object, the self-calibrating sensor according to present invention additionally has (1) a calibration value calculating circuit for calculating a calibration value and (2) a calibration completion determining circuit for determining whether the calibration value calculation is completed or not.

Specifically, a self-calibrating sensor according to the present invention has a sensor element for electrically detecting a change in physical amount of a workpiece, a signal output means for detecting the change of the sensor element and outputting an electric signal, a processor for conducting calibration calculation of the electric signal to adjust to the physical amount of the workpiece, and a memory for storing a calibration value for conducting calibration calculation by the processor. The self-calibrating sensor is characterized in that the processor includes a calibration value calculating circuit for calculating calibration value for conducting the calibration calculation from the electric signal outputted by the signal output means when a known calibrating physical amount is applied to the sensor element, a calibration arithmetic circuit for obtaining converted value of the physical amount by conducting calibration calculation based on the electric signal detected against unknown measured physical amount by using the calibration value calculated by the calibration value calculating circuit, and a calibration completion determining circuit for determining whether the calculation of the calibration value by the calibration value calculating circuit is completed, that a flag signal indicating whether the calibration value calculation by the calibration value calculating circuit is completed is stored in the memory together with the calibration value, and that the calibration completion determining circuit detects the flag signal for determining whether the calculation of the calibration value is completed or not.

According to the present invention, since the self-calibrating sensor has the aforesaid calibration value calculating circuit, the calibration value can be calculated inside the self-calibrating sensor, thereby eliminating the need for the connection of the self-calibrating sensor to the outside computer etc. further since the self-calibrating sensor has the aforesaid calibration completion determining circuit, the completion of the calibration value calculation can be judged inside the self-calibrating sensor. Accordingly, it is not required that the self-calibrating sensor is connected to the outside computer to check the completion of the calibration work by the outside computer.

Therefore, the self-calibrating sensor and the outside computer are not required to be connected by the exclusive I/O line for the calibration work, thereby reducing the cost for the measurement system including the self-calibrating sensor.

The serial interface etc. for connecting the I/O line for the calibration work are not required for the self-calibrating sensor, thereby reducing the production cost of the self-calibrating sensor. Further, since the calibration completion determining circuit judges the completion of calibration value calculation by the flag signal stored in the memory, whether the calibration value is calculated or not can be immediately detected in initiating the measurement by the self-calibrating sensor, thereby speeding up the judgement by the calibration completion determining circuit.

In the above arrangement, the calibrating physical amount is normally applied to the sensor element in a plurality of times and the calibration value calculating circuit calculates the calibration value based on calibrating physical amount applied in the plurality of times.

The conversion from the electric signal S such as a capacitance signal to pressure converted value P is conducted by a transforming formula. For instance, when the transforming formula is set as the simplest $P=aS+b$, the calibration value calculation is to calculate coefficients a and b of the above formula. The pressure converted value can be calculated based on the electric signal by obtaining the coefficients a and b. The coefficients a and b can be calculated by binary simultaneous equations set by two calibrating physical amounts $P_0$ and $P_1$ and electric signals S0 and S1 detected at that time period. Incidentally, the number of the coefficients increases as the transforming formula gets complicated, so that the calibrating physical amount is applied to the sensor element in an increasing number of times.

In order to apply the calibrating physical amount to the sensor element in a plurality of times, the calibrating physical amount may be applied in the plurality of times synchronizing with the on/off operation of the power supply unit of the self-calibrating sensor, or alternatively, the calibrating physical amount may be applied in the plurality of times at a predetermined interval from power-on operation of the power supply unit. Both arrangements are possible for the present invention.

When the calibrating physical amount is applied in the plurality of times synchronizing with the on/off operation of the power supply unit, the aforesaid processor preferably includes power-on counter for storing the power-on count of the calibrating physical amount in the memory.

Since the power-on count is stored in the memory by the power-on counter, the progress of the calibration work can be checked by referring to the power-on time stored in the memory by the calibration value calculating circuit, thereby automating the calibration work.

As the memory, a non-volatile memory of which stored information is not lost when the power supply unit is shut off is preferably used. For instance, EPROM (Erasable and Programmable Read Only Memory) and E2PROM (EEPROM, Electrically Erasable and Programmable Read Only Memory) may preferably be used.

By adopting the non-volatile memory as the memory, the stored information is not lost by the on/off operation of the power supply unit. Accordingly, information necessary after the calibration work such as the calibration value and flag signal indicating whether the calibration work is completed or not can be permanently stored for every self-calibrating sensor. Further, repeated calibration work etc. can be made unnecessary and, during the calibration work, intermediate information such as the power-on count can be retained irrespective of the on/off operation of the power supply unit.

When the calibrating physical amount is applied in the plurality of time at a predetermined interval from the power-on operation of the power supply circuit, the calibration value calculating circuit preferably calculates the calibration value from the calibrating physical amount applied in the plurality of times.

Since the calibration pressure is sequentially applied within a predetermined time period after the power-on operation of the power supply unit unlike applying the calibration pressure in synchronization with the on/off operation of the self-calibrating sensor, the intermediate information for calculating the calibration value is not required to be stored in the non-volatile memory and the like, thereby minimizing the information stored in the non-volatile memory. Further, since the plural on/off operations of the power supply unit are not required, the load applied to the other circuit of the self-calibrating sensor in accordance with the on/off operation can be minimized in conducting calibration work.

BRIEF DESCRIPTION OF THE DRAWINGS

FIG. 8 is a graph showing time of a timer circuit and timing for applying calibration pressure according to the second embodiment;

DETAILED DESCRIPTION OF PREFERRED EMBODIMENT(S)

An embodiment of the present invention will be described below with reference to attached drawings. Incidentally, description of a component identical with or similar to the aforesaid components or member will be omitted or abbreviated.

[First Embodiment]

Figure 1:
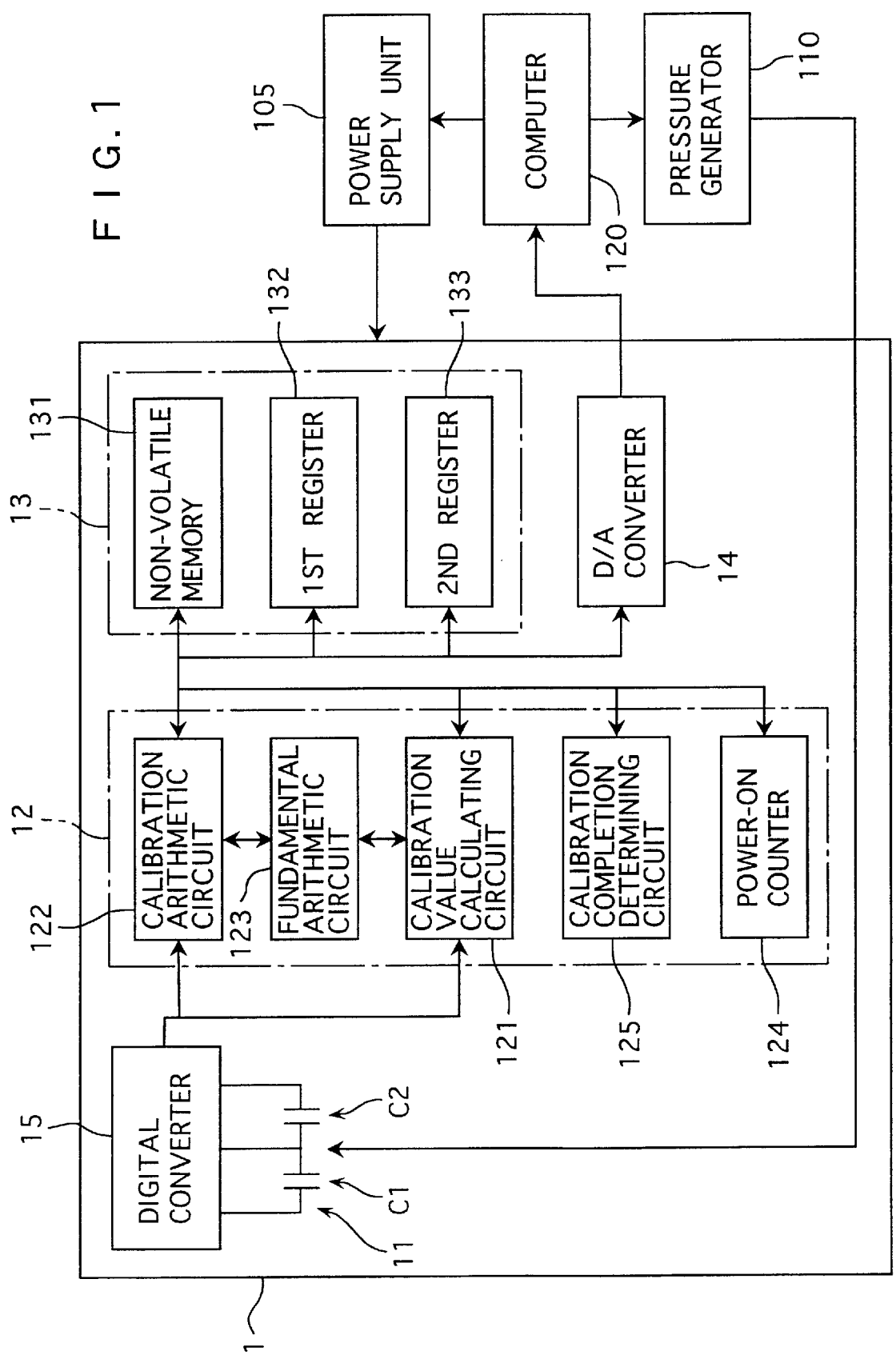
FIG. 1 is a block diagram showing arrangement of a self-calibrating sensor according to first embodiment of the present invention.

FIG. 1 shows a measurement system having self-calibrating sensor 1 according to first embodiment of the present invention.

The measurement system has the self-calibrating sensor 1, a computer 120 for controlling the self-calibrating sensor 1, a pressure generator 110 for applying calibration pressure to the sensor element 11 of the self-calibrating sensor 1, and a power supply unit 105 for supplying electric power to the self-calibrating sensor 1.

(1) Entire Arrangement of the Measurement System

The self-calibrating sensor 1 has a sensor element 11, a processor 12 composed of ASIC including CPU, a memory 13, a D/A converter 14 and a digital converter 15.

The sensor element 11 includes two capacitors composed of a movable electrode provided on a diaphragm and fixed electrode, the two capacitors having electro-capacitance of C1 and C2. The digital converter 15 is a signal output means for digitally converting the electro-capacitance C1 and C2. In other words, the signal output means outputs a change in the electro-capacitance C1 and C2 by the digital converter 15 when the diaphragm deforms in accordance with the change in the pressure of the workpiece and causes change in the electro-capacitance C1 and C2 of the capacitors.

The processor 12 processes the electro-capacitance signal C1 and C2 outputted by the digital converter 15, which includes a calibration value calculating circuit 121, a calibration arithmetic circuit 122, a fundamental arithmetic circuit 123, a power-on counter 124 and a calibration completion determining circuit 125.

The memory 13 stores a calibration value outputted by the processor 12 and other calculation result, which includes non-volatile memory 13 composed of E2PROM, first register 132 composed of RAM (Random Access Memory) and second register 133.

The first and second registers 132 and 133 are regions for temporarily storing intermediate calculation result of the processor 12. Furthermore, the non-volatile memory 131 stores a flag signal indicating whether the calibration work of the self-calibration sensor 1 is completed or not and power-on count of calibration pressure.

(2) Arrangement of Sensor Element 11

Figure 2:
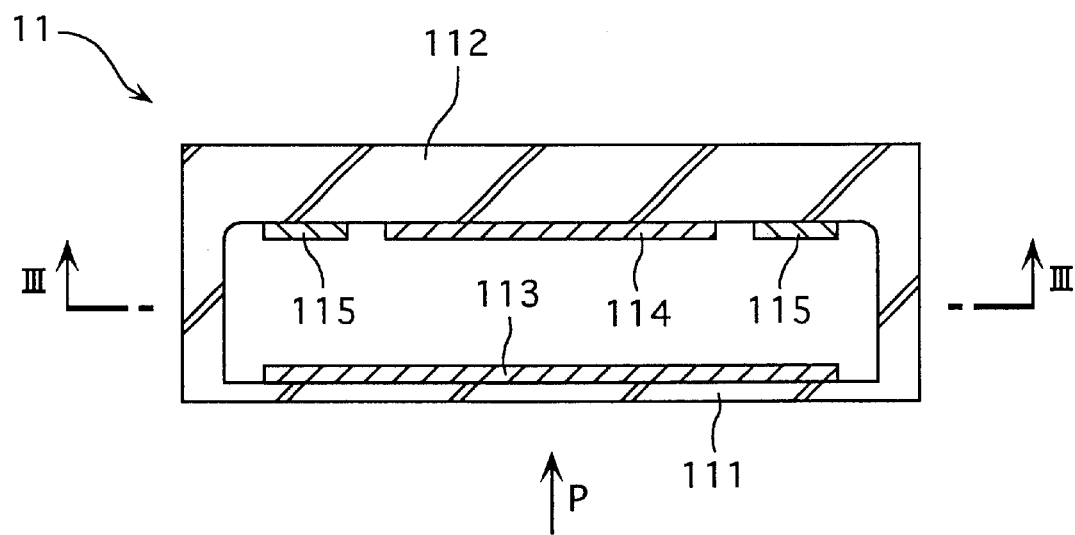
FIG. 2 is a vertical section showing structure of sensor element of the aforesaid embodiment.

As shown in FIG. 2, the sensor element 11 has a diaphragm 111 deforming in a direction orthogonal to a surface thereof by pressure P, a substrate 112 supporting the diaphragm 111 at the outer circumference thereof, a movable electrode 113 formed on a surface of the diaphragm 111 opposing the substrate 112, a first fixed electrode 114 and a second fixed electrode 115 formed on the substrate 112 opposing the movable electrode 113.

Figure 3:
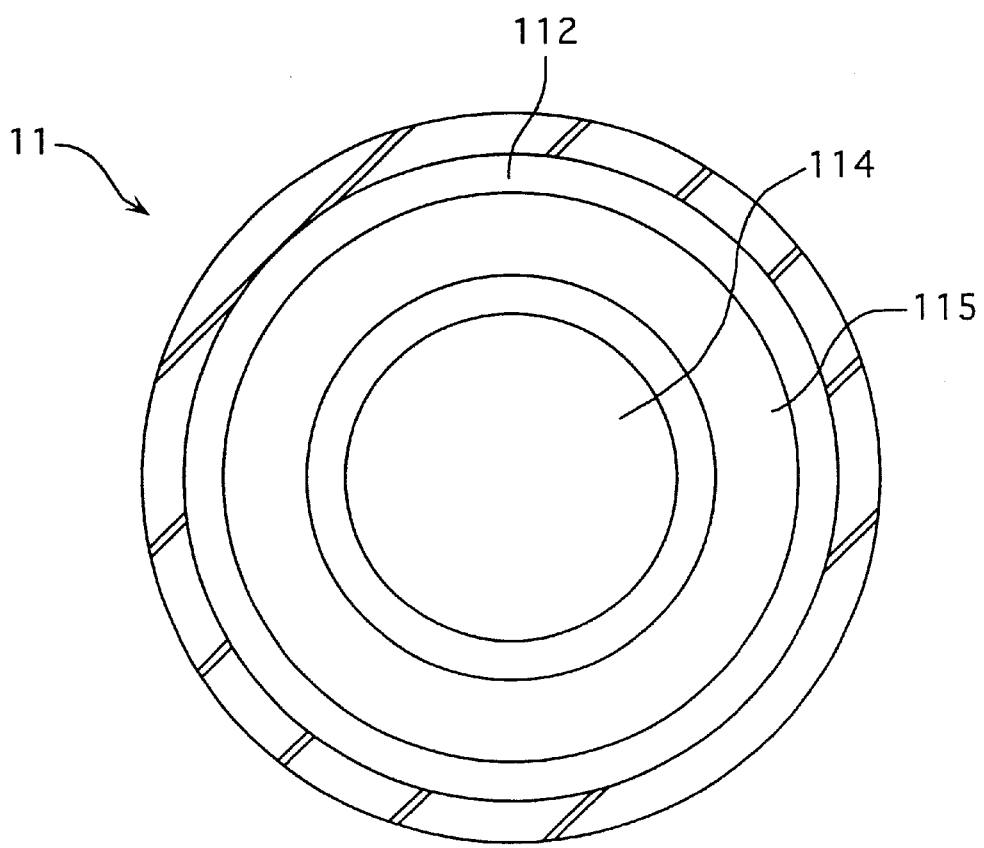
FIG. 3 is a horizontal section taken along III—III line of FIG. 2.

The movable electrode 113 follows the deformation of the diaphragm 111 in the direction orthogonal to the surface thereof and approaches and recede from the first fixed electrode 114 and the second fixed electrode 115 by applying the pressure P to the diaphragm 111. As shown in FIG. 3, the first fixed electrode 114 is formed on the substrate 112 in an approximate circle around a deformation center of the diaphragm 111. The second fixed electrode 115 is formed in a ring-shape surrounding the outer circumference of the first electrode 114. On the other hand, the movable electrode 113 is formed on the diaphragm 111 in an approximate circle corresponding to an edge of the outer circumference of the second fixed electrode 115.

Figure 4:
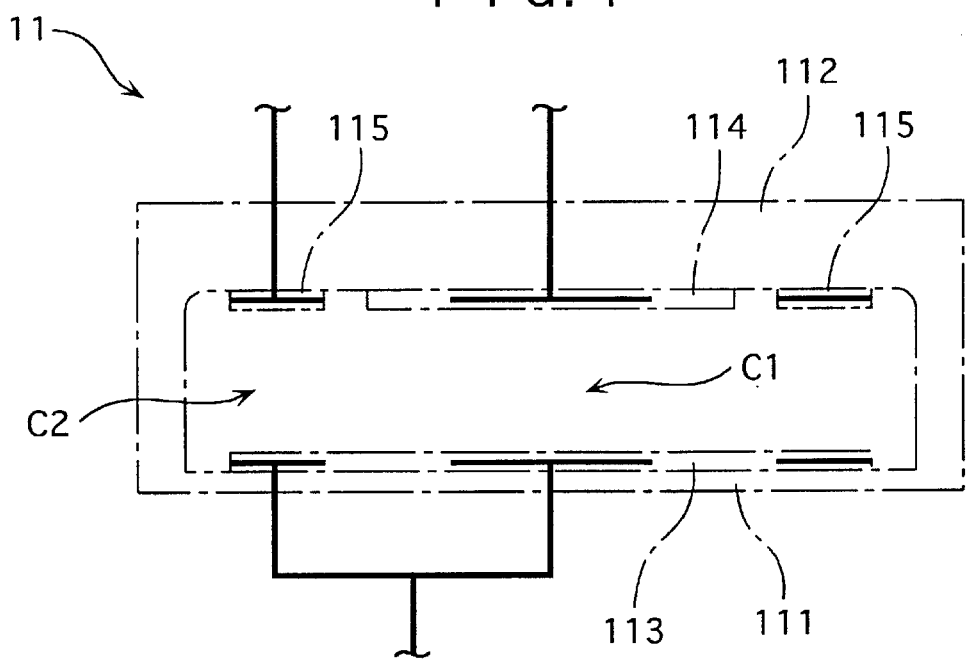
FIG. 4 is a schematic view showing capacitor composed of a movable electrode and a fixed electrode of the sensor element according to the first embodiment.

As shown in FIG. 4, the movable electrode 113 and the first fixed electrode 114 compose a capacitor having electro-capacitance Cl, and the movable electrode 113 and the second fixed electrode 115 compose a capacitor having electro-capacitance C2. The digital converter 15 detects a change in the electro-capacitance C1 and C2 of these capacitors to output the electro-capacitance signals after digital conversion.

(3) Arrangement of Processor

The calibration arithmetic circuit 122 of the processor 12 is a circuit for assigning the calibration value calculated by the calibration value calculating circuit 121 to a predetermined transforming formula and for obtaining pressure converted value P from the electro-capacitance signal C1 and C2. The calculated pressure converted value P is outputted to the outside computer 120 etc. through the D/A converter 14. Specifically, the transforming formula is given by the following formula (1) with regard to the electro-capacitance ratio k(=C2/C1) of the electro-capacitance signal C1 and C2, and the calibration values α,β and γ.

$$P = \frac{\gamma \times (k - \beta)}{1 + \alpha \times (k - \beta)} \quad (1)$$

Incidentally, α is feedback gain, β is offset and γ is open loop gain, respectively as calibration values for calibrating linearity, gain, and offset regarding relationship between the pressure P acting on the diaphragm 111 and the electro-capacitance ratio k. The self-calibrating sensor 1 can conduct highly accurate measurement over the entire measurement range by calculating the calibration values α, β and γ. The electro-capacitance ratio k is used as a parameter in the above formula (1) for canceling errors accompanying with the change in accordance with temperature and time of the electro-capacitance C1 and C2.

The calibration value calculating circuit 121 calculates the aforesaid calibration values α, β and γ based on known calibration pressure outputted by the pressure generator 110 and the electro-capacitance signal C1 and C2 outputted by the sensor element 11. In the present embodiment, three different calibration pressures $P_0$, $P_1$ and $P_2$ are applied and ternary simultaneous equations obtained by assigning electro-capacitance ratio $k_0$, $k_1$ and $k_2$ calculated corresponding to the above calibration pressures into the above formula (1) are solved for calculating the calibration values α, β and γ.

The fundamental arithmetic circuit 123 is a circuit for conducting a part of calculation of the aforementioned calibration value calculating circuit 121 and calibration arithmetic circuit 122.

The provision of the fundamental arithmetic circuit 123 enables to simplify the structure of the calibration value calculating circuit 121 and the calibration arithmetic circuit 122, thereby simplifying the entire structure of the processor 12 for reducing production cost of the self-calibrating sensor 1.

More specifically, the fundamental arithmetic circuit 123 conducts calculation according to following fundamental arithmetic formula (2) with regard to a predetermined arguments X, Y, Z and W inputted by the calibration value calculating circuit 121 and the calibration arithmetic circuit 122, and outputs the calculation result f to the calibration value calculating circuit 121 and the calibration arithmetic circuit 122.

$$f = \frac{Z - W}{X - Y} \quad (2)$$

The above three different calibration pressures $P_0$, $P_1$ and $P_2$ are applied by the pressure generator 110 by a control instruction from the computer 120. The impressing timing of the calibration pressure synchronizes with on/off operation of the power supply unit 105, thereby allowing the processor 12 to recognize the application of the calibration pressures $P_0$, $P_1$ and $P_2$.

Figure 5:
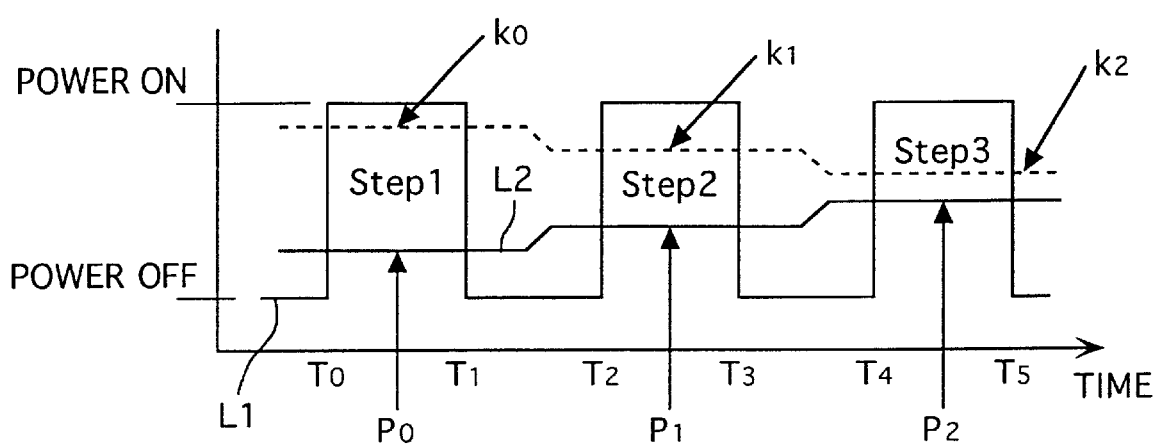
FIG. 5 is a graph showing on/off operation of the power supply unit and application timing of calibration pressure of the first embodiment.

More specifically, three different calibration pressures $P_0$, $P_1$ and $P_2$ are required to be applied for obtaining the calibration values α, β and γ in the present embodiment. As shown in a graph of FIG. 5, the computer 120 outputs a control signal to the pressure generator 110 to apply the calibration pressure shown in calibration pressure line L2 to an on/off operation line L1 of the power supply unit 105.

In other words, the computer 120 outputs the control signal to apply the calibration pressure $P_0$, $P_1$ and $P_2$ respectively at timing shown in Step 1 to Step 3.

In response, the calibration value calculating circuit 121 detects the power-on count stored in the non-volatile memory 131 and obtains the calibration pressure $P_0$, $P_1$ and $P_2$ and electro-capacitance ratio $k_0$, $k_1$ and $k_2$ in accordance with Step 1 to Step 3 to output to the non-volatile memory 131.

The power-on counter 124 of the processor 12 adds the power-on count acquired by the calibration value calculating circuit 121 from the non-volatile memory 131 and the power-on count detected by the number of on/off operation times of the power supply unit 105, and records the entire number of times to the non-volatile memory 131.

More specifically, the power-on count of one is stored in the non-volatile memory 131 in a condition without calibration. The power-on counter 124 adds one to the power-on count of one to make the power-on count of two when on/off operation of the power supply unit 105 is conducted once, and the power-on count is stored in the non-volatile memory 131.

The calibration completion determining circuit 125 obtains flag signal FL stored in the non-volatile memory 131 to determine whether the calculation of the calibration value is completed or not based on the obtained flag signal FL.

When the obtained flag signal FL is "true" (calibration completed), the calibration completion determining circuit 125 outputs a control signal indicating measurable condition to the calibration arithmetic circuit 122. Consequently, the calibration arithmetic circuit 122 enters a Normal Operating Mode of calibrating the output of the sensor element 11 and outputting through the D/A converter 14 etc.

On the other hand, when the obtained flag signal FL is false (not calibrated yet), the calibration completion determining circuit 125 then outputs a control signal for conducting calibration to the calibration value calculating circuit 121, so that the calibration value is started to be calculated by the calibration value calculating circuit 121 (Self-Calibrating Mode).

(4) Calculation of Calibration Values α, β and γ by Calibration Value Calculating Circuit 121

The process for calculating the calibration values α, β and γ by the calibration value calculating circuit 121 will be described next.

Ternary simultaneous equations are obtained by assigning the calibration pressures $P_0$, $P_1$ and $P_2$ applied by the pressure generator 110 to the sensor element 11 and the electro-capacitance ratio $k_0$, $k_1$ and $k_2$ corresponding to respective calibration pressures into the formula (1). Following formulas (3) to (5) with regard to calibration values α, β and γ can be obtained by solving the ternary simultaneous equations. Incidentally, the calibration pressures $P_0$ to $P_2$ are set as $P_0=0$ and $P_2=2P_1$ for the convenience of calculating formulas (3) to (5).

$$\alpha = \frac{k_2 - 2 \times k_1 + k_0}{(k_1 - k_0) \times (k_2 - k_0)} \quad (3)$$

$$\beta = k_0 \quad (4)$$

$$\gamma = \frac{P_2 \times (k_2 - k_1)}{(k_1 - k_0) \times (k_2 - k_0)} \quad (5)$$

$\because P_0 = 0, P_2 = 2 \times P_1$

The formulas (3) to (5) are modified into following formulas (6) to (8) for conducting calculation by the fundamental arithmetic formula (2) of aforementioned fundamental arithmetic circuit 123.

$$\alpha = \frac{(1-0)}{(k_1 - k_0)} - \frac{(0-2)}{(k_2 - k_0)} \quad (6)$$

$$\beta = \frac{k_0 - 0}{2 - 1} \quad (7)$$

$$\gamma = \frac{(P_2 - 0)}{(k_1 - k_0)} - \frac{(P_2 - 0)}{(k_2 - k_0)} \quad (8)$$

(4-1) Calculation of Calibration Value α

The calibration value α is calculated based on the above formula (6). As shown in following Table 1, the calculation of the formula (2) in the fundamental arithmetic circuit 123 is conducted in three steps.

TABLE 1

| Calibration Value | Step | Argument | | | | Working Register |
|---|---|---|---|---|---|---|
| | | X | Y | Z | W | |
| α | 1 | $k_1$ | $k_0$ | 1 | 0 | REG1 |
| | 2 | $k_2$ | $k_0$ | 0 | 2 | REG2 |
| | 3 | 2 | 1 | REG1 | REG2 | |

In the first step, the calibration value calculating circuit 121 sets $k_1$ of first term of the formula (6) as X, $k_0$ as Y, 1 as Z and 0 as W, and outputs the arguments to the fundamental arithmetic circuit 123. The fundamental arithmetic circuit 123 conducts calculation represented by the formula (2) based on the arguments X, Y, Z and W inputted by the calibration value calculating circuit 121 and the calculation result REG1 is stored in the first register 132.

In the second step, the calibration value calculating circuit 121 sets $k_2$ of second term of the formula (6) as X, $k_0$ as Y, 0 as Z and 2 as W, and outputs the arguments to the fundamental arithmetic circuit 123. The calculation result REG2 by the fundamental arithmetic circuit 123 is stored in the second register 133.

In the third step, the calibration value calculating circuit 121 sets 2 as X, 1 as Y, REG1 stored in the first register 132 as Z and REG2 stored in the second register 133 as W, and outputs the arguments to the fundamental arithmetic circuit 123. The fundamental arithmetic circuit 123 calculates in the similar manner to the above.

As can be seen in the formula (6), the calculation result obtained in the third step is the calibration value α, which is stored in the non-volatile memory 131 through the calibration value calculating circuit 121. Incidentally, the values of X=2 and Y=1 of the third step are values set for the convenience of making X−Y=1. The values may be set as X=1 and Y=0.

(4-2) Calculating Calibration Value β

The calibration value β can be calculated by the fundamental arithmetic circuit 123 by modifying the above formula (4) as the formula (7). Incidentally, since β=$k_0$ as shown in the formula (4), the calibration value calculating circuit 121 may be configured so that the value of the electro-capacitance ratio $k_0$ at the first calibration pressure $P_0$ is directly stored in the non-volatile memory 131 without calculating by the fundamental arithmetic circuit 123.

(4-3) Calculating Calibration Value γ

The calibration value γ is calculated according to the formula (8). The calculation of the formula (2) is conducted by the fundamental arithmetic circuit 123 in three steps as in calculation of the calibration value α. Specifically, values shown in following Table 2 are set for the arguments X, Y, Z and W outputted by the calibration value calculating circuit 121 and are calculated in the similar process as in calculation of the calibration value α. The calculation result by the three steps are stored in the non-volatile memory 131 as the calibration value of the coefficient γ.

TABLE 2

| Calibration Value | Step | Argument | | | | Working Register |
|---|---|---|---|---|---|---|
| | | X | Y | Z | W | |
| γ | 1 | $k_1$ | $k_0$ | $P_2$ | 0 | REG1 |
| | 2 | $k_2$ | $k_0$ | $P_2$ | 0 | REG2 |
| | 3 | 2 | 1 | REG1 | REG2 | |

(5) Calibration Calculation by Calibration Arithmetic Circuit 122

Process for calculating the electro-capacitance ratio k from the detected electro-capacitance signal C1 and C2 by the calibration arithmetic circuit 122 for calculating the pressure converted value P by assigning the electro-capacitance ratio k in the above formula (1) will be described below.

(5-1) Calculation of Electro-Capacitance Ratio k (First Correction)

First correction is conducted to the electro-capacitance signals C1 and C2 outputted by the sensor element 11 through the digital converter 15 by the calibration arithmetic circuit 122 to calculate the electro-capacitance ratio k. The calculation by the fundamental arithmetic circuit 123 is made possible by modifying the formula k=C2/C1 into following formula (9).

$$k = \frac{C2}{C1} = \frac{C2 - 0}{C1 - 0} \quad (9)$$

Specifically, one step calculation is conducted by the fundamental arithmetic circuit 123 and the calculation result is stored in the first register 132 as REG1, as shown in following Table 3.

TABLE 3

| Step | Argument | | | | Working Register |
|---|---|---|---|---|---|
| | X | Y | Z | W | |
| 1 | C1 | 0 | C2 | 0 | REG1 |

(5-2) Calibration Calculation of Pressure P (Feedback Correction)

After the above first correction, the calibration arithmetic circuit 122 calls the calculation result REG1 calculated by the first correction and calibration values α, β and γ obtained by the calibration work respectively from the first register 132 and the non-volatile memory 131 for performing feedback correction based on the formula (1) to conduct calibration calculation of the pressure P.

Specifically, the formula (1) is modified into formula (10) having the fundamental calculation formula (2) as a factor.

$$P = \frac{\gamma \times (k-\beta)}{1 + \alpha \times (k-\beta)} = \frac{\gamma - 0}{\frac{1-0}{(k-\beta)} - \frac{\alpha - 0}{(1-2)}} \quad (10)$$

The pressure converted value P can be obtained by outputting arguments X, Y, Z and W from the calibration arithmetic circuit 122 as shown in following Table 4 and conducting three-step calculation by the fundamental arithmetic circuit 123.

TABLE 4

| Step | Argument | | | | Working Register |
|---|---|---|---|---|---|
| | X | Y | Z | W | |
| 1 | REG1 | β | 1 | 0 | REG1 |
| 2 | 1 | 2 | α | 0 | REG2 |
| 3 | REG1 | REG2 | γ | 0 | |

(6) Function of Self-Calibrating Sensor 1

Figure 6:
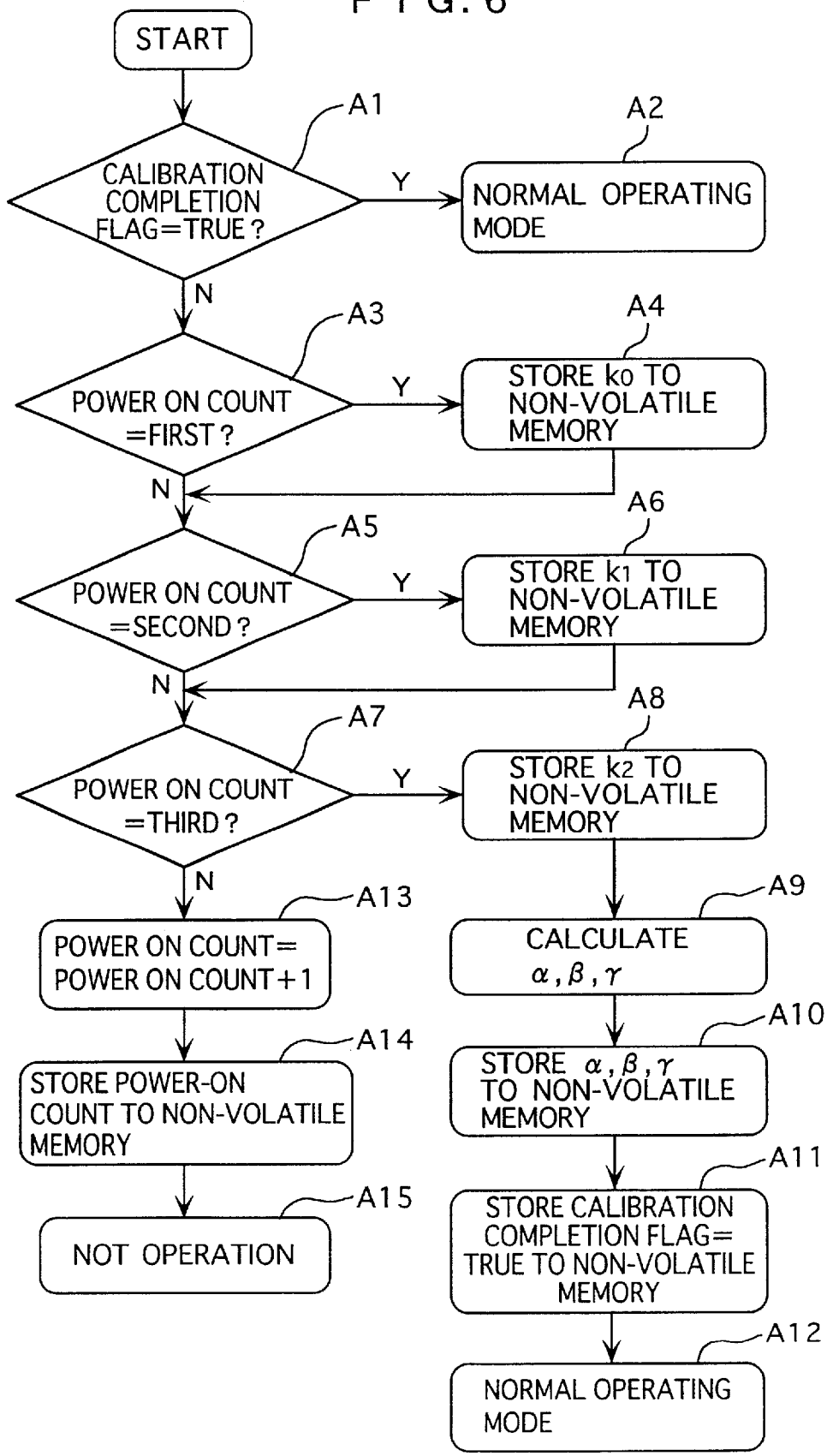
FIG. 6 is a flow chart for illustrating operation according to the first embodiment.

The function of the self-calibrating sensor 1 having the above configuration will be described below based on flow chart shown in FIG. 6.

(6-1) Branch Process A1

After turning the power of the power supply unit 105 of the self-calibration sensor 1, the calibration completion determining circuit 125 detects flag signal FL stored in the non-volatile memory 131. When the flag signal FL indicates "true", the calibration arithmetic circuit 122 enters into normal operation mode where the output of the sensor element 11 is calibrated and outputted through the D/A converter 14 and the like (process A2).

On the other hand, when the flag signal FL indicates "false", the self-calibrating sensor 1 starts calculating the calibration value by the calibration value calculating circuit 121, since the self-calibrating sensor 1 is not calibrated yet (Self-Calibrating Mode).

In the self-calibrating mode, the computer 120 controls on/off of the power supply unit 105 and sequentially apply calibration pressure $P_0$, $P_1$ and $P_2$ to the sensor element 11 in synchronization with the on/off operation by the pressure generator 110.

(6-2) Branch Process A3, A5

While the calibration pressure is applied to the sensor element 11, the calibration value calculating circuit 121 detects the power-on count stored in the non-volatile memory 131. When the detected power-on count is one meaning initial calibration condition (branch process A3), the calibration value calculating circuit 121 obtains the electro-capacitance signal C1 and C2 detected based on the calibration pressure $P_0$ for calculating the electro-capacitance ratio $k_0$ to store the calibration pressure $P_0$ and the electro-capacitance ratio $k_0$ in the non-volatile memory 131 (process A4).

After storing the calibration pressure $P_0$ and the electro-capacitance ratio $k_0$ in the non-volatile memory 131, a decision is conducted according to the branch processes A5 and A7. However, since the power-on count is one, it is judged "no" in both of the branch processes A5 and A7.

One for the on/off operation of the power supply unit 105 is added to the power-on count of one detected by the calibration value calculating circuit 121, making the power-on count as two (process A13). After storing the power-on count of two in the non-volatile memory 131 (process A14), the self-calibration sensor 1 stops its function (process A15).

On the other hand, when the calibration value calculating circuit 121 detects the power-on count stored in the non-volatile memory 131 as two or three, the calibration value calculating circuit 121 judges that the electro-capacitance ratio $k_0$ based on the first calibration value $P_0$ is already stored in the non-volatile memory 131 and conducts judgement according to branch process A5.

Similar operation is performed in the branch process A5, and the calibration value calculating circuit 121 obtains the electro-capacitance signal C1 and C2 based on the calibration pressure $P_1$ applied by the pressure generator 110 and store the calibration pressure $P_1$ and the electro-capacitance ratio $k_1$ in the non-volatile memory 131 (process A6).

(6-3) Branch Process A7

When the detected power-on count is three, the calibration pressure $P_2$ is applied to the sensor element 11 and the calibration value calculating circuit 121 obtains the calibration pressure $P_2$ and the electro-capacitance ratio $k_2$ to store the information in the non-volatile memory 131 (process A8).

The calibration value calculating circuit 121 calls the calibration pressures $P_0$ to $P_2$ and the electro-capacitance ratio $k_0$ to $k_2$ from the non-volatile memory 131, calculates the calibration values α, β and γ using the fundamental arithmetic circuit 123 (process A9), and store the calibration values α, β and γ in the non-volatile memory 131 (process A10).

Thereafter, the calibration value calculating circuit 121 sets the flag signal FL as True and stores in the non-volatile memory 131 (process A11), and sets the calibration arithmetic circuit 122 on standby and stops the operation (process A12).

On the other hand, when the power-on count is neither one of one to three, the power-on count stored in the non-volatile memory 131 is considered to be zero and the recorded information must be wrong. Accordingly, one is added to the power-on count (process A13), the power-on count is stored in the non-volatile memory 131 (process A14) and the operation of the self-calibrating sensor 1 is stopped (process A15).

When the power is turned on after once shutting off the power supply unit 105, the above flow chart is restarted from the branch process A1.

(7) Effect of the First Embodiment

According to the above first embodiment, following effects can be obtained.

Since the self-calibrating sensor 1 has the aforesaid calibration value calculating circuit 121, the calibration values α, β and γ can be calculated inside the self-calibrating sensor 1 based on the formulas (1) and (2), and the self-calibrating sensor 1 and the outside computer 120 are not required to be connected for calculating the calibration values.

Since the self-calibrating sensor 1 has the calibration completion determining circuit 125, if the calibration work is already completed when the power is turned on in the self-calibrating sensor 1, the normal operating mode can be solely and securely implemented without entering the self-calibrating mode.

Accordingly, the self-calibrating sensor 1 and the outside computer 120 are not required to be connected by exclusive I/O line for the calibration work, thereby reducing the cost of the measurement system including the self-calibrating sensor 1.

Since the serial interface and the like are not required in the self-calibrating sensor 1 for connecting I/O line for the calibration work, the production cost of the self-calibrating sensor 1 can be reduced for the serial interface etc.

Since the aforementioned self-calibrating sensor 1 has the power-on counter 124, the power-on count can be recorded in the non-volatile memory 131. The power-on count is detected by the calibration value calculating circuit 121 in conducting calibration work for checking the progress of the calibration work, thereby automating the calibration work.

Further, since the record information such as the calibration values $\alpha$, $\beta$ and $\gamma$, the flag signal FL and the power-on count are stored in the non-volatile memory 131, the record information is not lost by the on/off operation of the power supply unit 105. Accordingly, since the above information is permanently stored in the self-calibrating sensor 1 after conducting calibration once, repeated calibration work is not necessary as a general rule. Further, since the power-on count as an intermediate information is stored in the non-volatile memory 131, the recorded power-on count is not influenced by the on/off operation of the power supply unit 105.

[Second Embodiment]

Second embodiment of the present invention will be described below.

According to the aforesaid self-calibrating sensor 1, the calibration pressures $P_0$ to $P_2$ for calculating the calibration values $\alpha$, $\gamma$ and $\gamma$ are applied in synchronization with the on/off operation of the power supply unit 105 and the number of times of the on/off operation is detected by the power-on counter 124 to be stored in the non-volatile memory 131, so that the progress of the calibration work is checked, thereby automating the calibration work.

Figure 7:
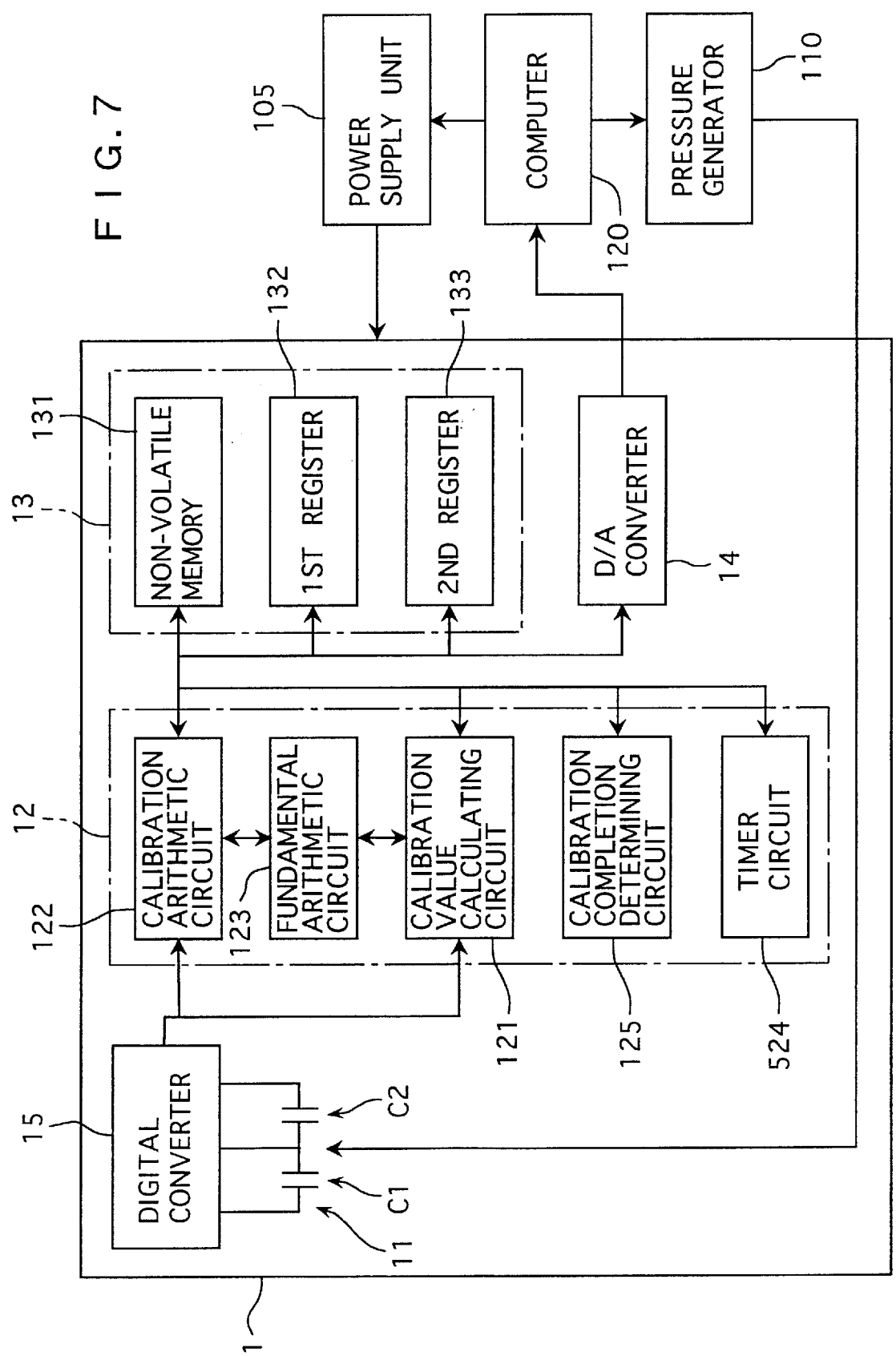
FIG. 7 is a block diagram showing arrangement of a self-calibrating sensor according to second embodiment of the present invention.

On the other hand, the self-calibrating sensor 5 according to the second embodiment shown in FIG. 7 applies the calibration physical amount in a plurality of times at a predetermined interval from power-on operation of the power supply unit 105 and the time after turning on the power supply is detected by a timer circuit 524 to check the progress of the calibration work.

Though not shown in FIG. 7, the computer 120 has a built-in timer turning on simultaneously with power-on operation of the power supply unit 105. The built-in timer sequentially applies the calibration pressures $P_0$, $P_1$ and $P_2$ at a predetermined interval.

Specifically, as shown in FIG. 8, the computer 120 outputs a control signal to the pressure generator 110 to apply the calibration pressure $P_0$ at the time $T_1$ from the power-on time ($T_0$) of the power supply unit 105, calibration pressure $P_1$ at $T_2$, and calibration pressure $P_2$ at $T_3$.

The processor 52 of the self-calibrating sensor 5 has the timer circuit 524 synchronizing with the built-in timer of the computer 120. The calibration value calculating circuit 121 detects the electro-capacitance C1 and C2 when the time counted by the timer circuit 524 comes to be the time for applying the calibration pressures $P_0$ to $P_2$.

Incidentally, since arrangement of the other parts of the self-calibrating sensor 5 is substantially identical with the first embodiment, description therefor is omitted.

Figure 9:
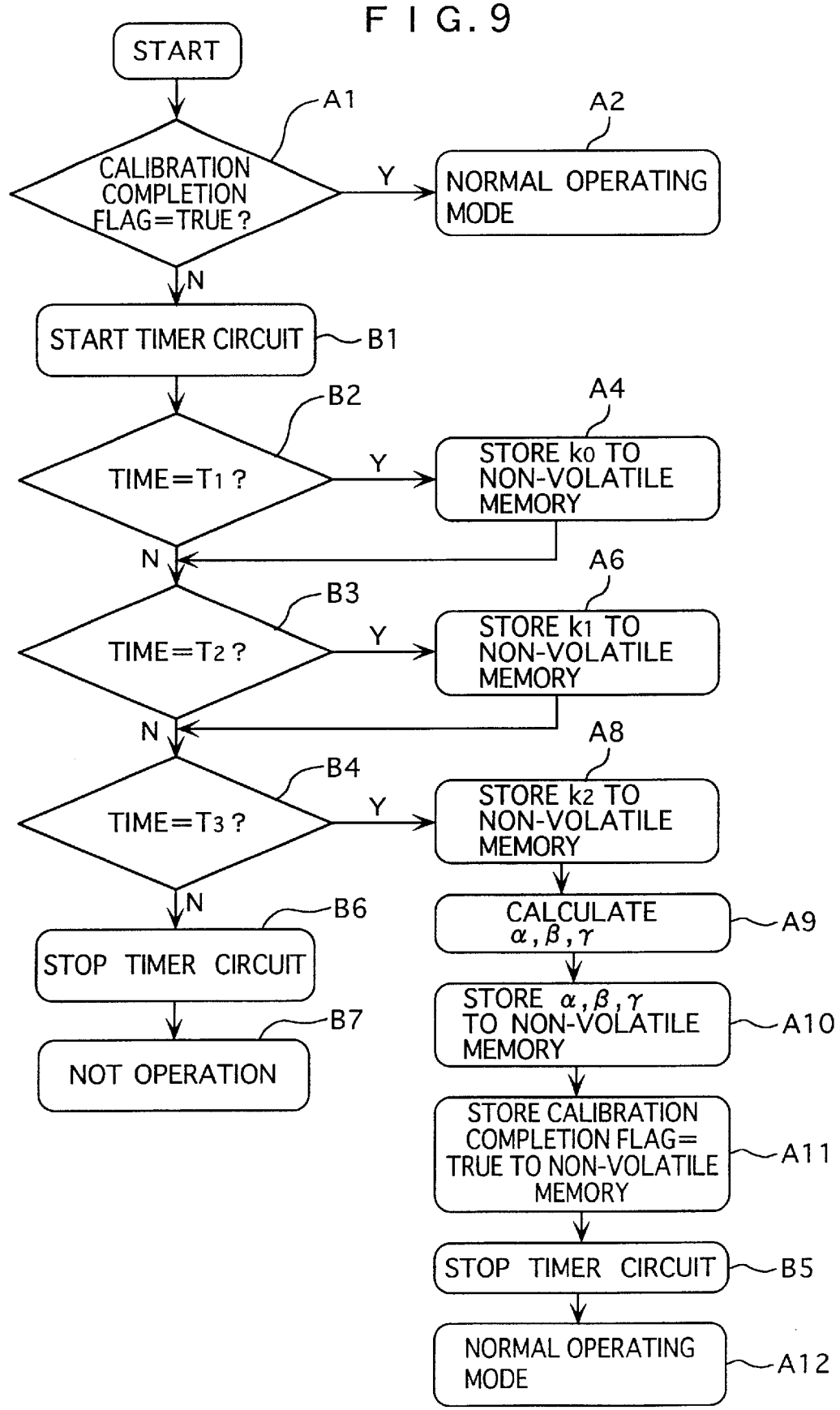
FIG. 9 is a flow chart for illustrating an operation of the second embodiment.
Figure 10:
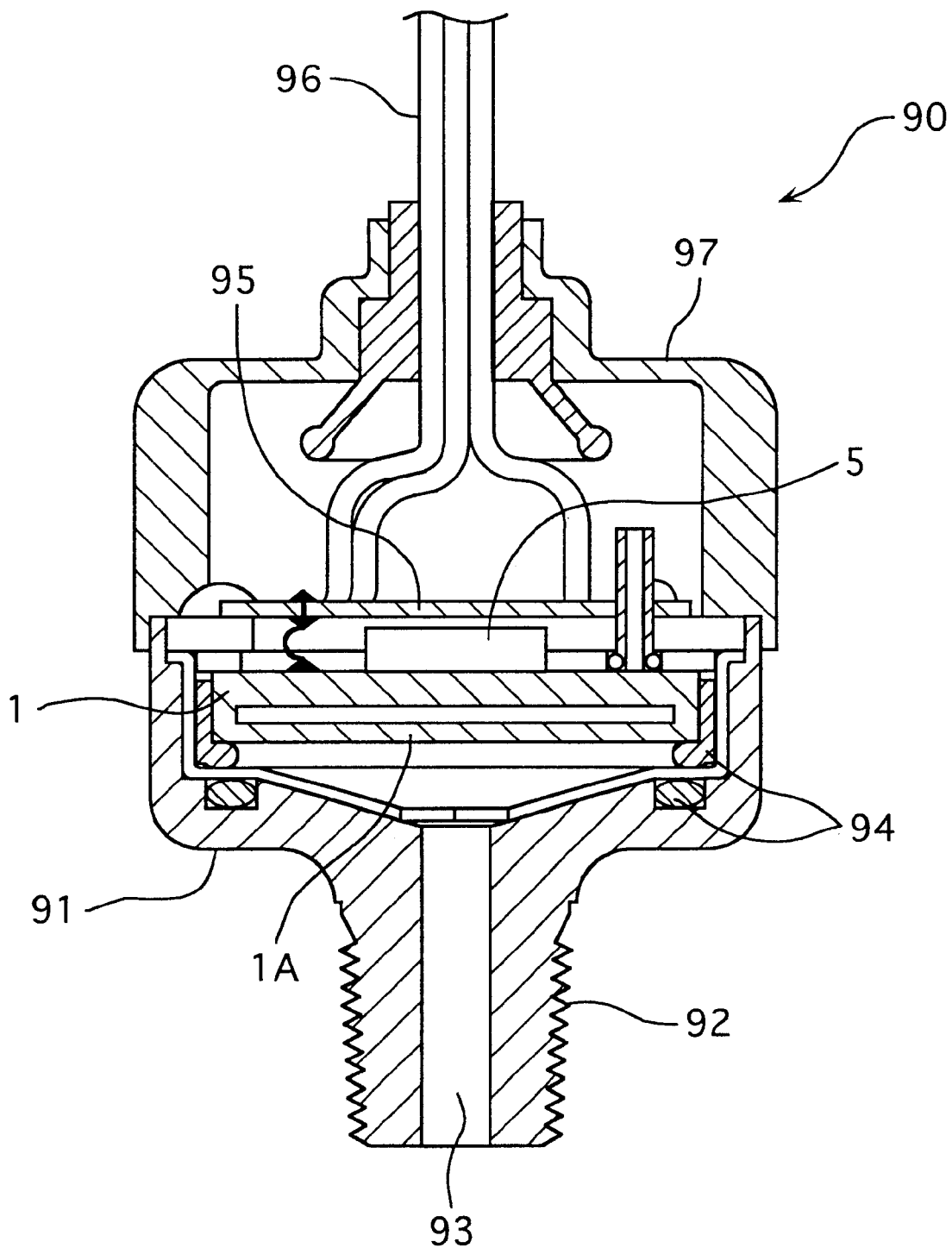
FIG. 10 is a cross section showing structure of conventional electro-capacitance pressure sensor.
Figure 11:
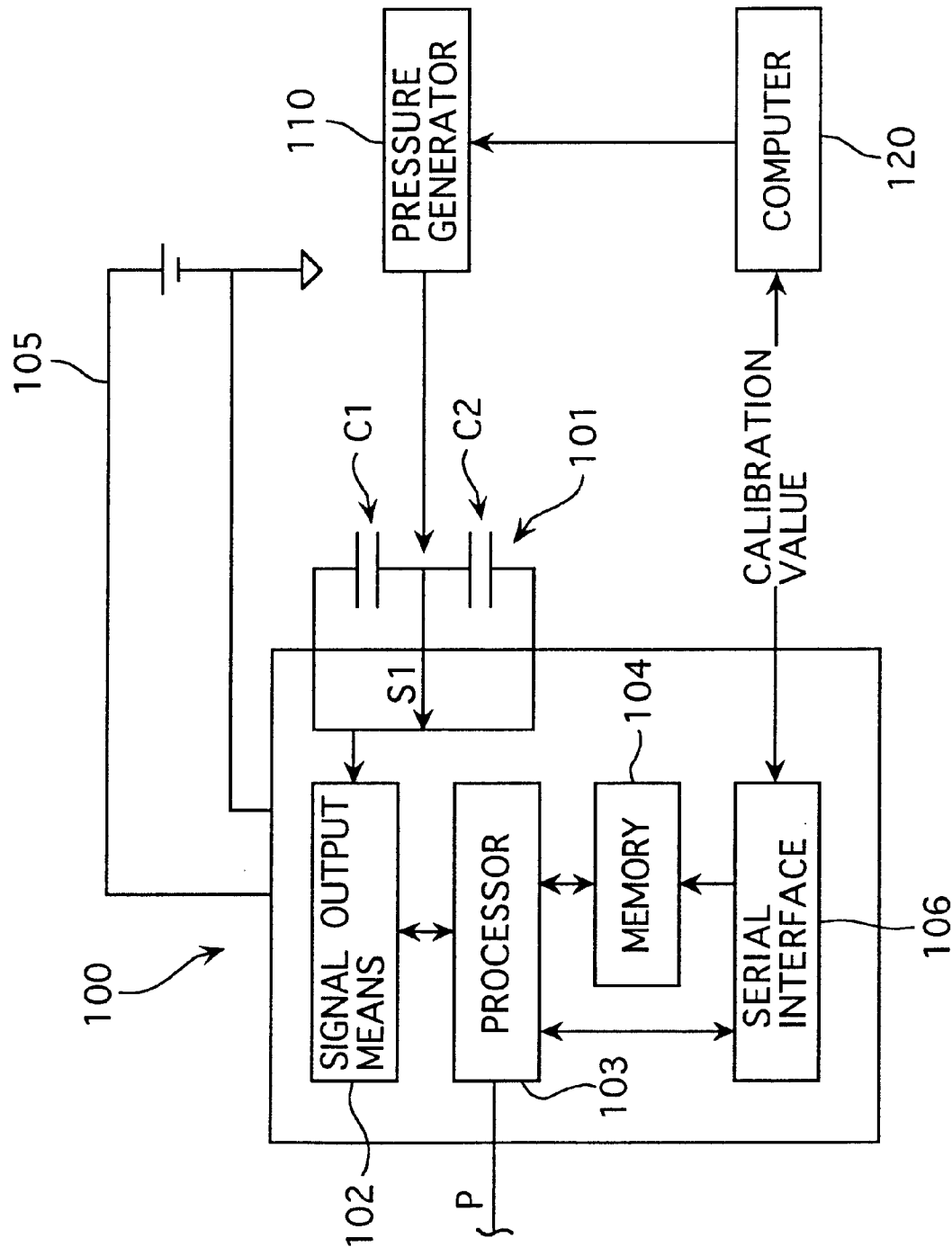
FIG. 11 is a block diagram showing arrangement of the conventional self-calibrating sensor.

The self-calibrating sensor 5 according to the second embodiment is operated according to a flow chart shown in FIG. 9.

When the flag signal FL is detected "false" in a branch process A1 for judging the flag signal FL similar to the aforesaid first embodiment, considering the false flag signal FL as a trigger signal, the built-in time of the computer 120 and the timer circuit 524 of the self-calibrating sensor 5 starts counting the time synchronizing with each other (process B1).

While checking the time of the built-in timer, the computer 120 outputs a control signal to the pressure generator 110 for applying the calibration pressure $P_0$ to the sensor element 11 when the time for applying the calibration pressure $P_0$ (time $T_1$) comes.

The pressure generator 110 applies the calibration pressure $P_0$ to the sensor element 11 based on the control signal.

The calibration value calculating circuit 121 detects the time $T_1$ for applying calibration pressure by means of the timer circuit 524, and obtain the electro-capacitance ratio $k_0$ at the time period to store in the non-volatile memory 131 together with the calibration pressure $P_0$.

The electro-capacitance $k_1$ and $k_2$ are sequentially stored in the non-volatile memory 131 at time $T_2$ for applying the calibration pressure $P_1$ and $T_3$ for applying the calibration pressure $P_2$ in a similar manner to the above.

When the electro-capacitance ratio $k_2$ is stored in the non-volatile memory 131 (process A8), the calibration values $\alpha$, $\beta$ and $\gamma$ are calculated based on the calibration pressures $P_0$ to $P_2$ and the electro-capacitance ratios $k_0$ to $k_2$ (process A9). Subsequently, the processor 52 stores the "true" calibration completion flag in the non-volatile memory 131 (process A11) and stops the timer circuit 524 (process B5). The calibration arithmetic circuit 122 enter the normal operation mode for calibrating the output of the sensor element 11 to output through the D/A converter 14 etc (process A12).

On the other hand, if neither one of the time $T_1$, $T_2$ and $T_3$ is detected, the timer count of the timer circuit is considered to be malfunctioning. Accordingly, the time circuit is stopped (process B6) to stop the operation of the self-calibrating sensor 5 (process B7).

According to the aforementioned second embodiment, following effects can be obtained as well as the effects mentioned in the first embodiment.

Since the calibration pressures are applied within a predetermined period of time after the power-on operation of the power supply unit 105 in contrast to applying the calibration pressures $P_0$ to $P_2$ in synchronization with the on/off operation of the power supply unit 105, the intermediate information for calculating the calibration values $\alpha$, $\beta$ and $\gamma$ are not required to be stored in the non-volatile memory etc., thereby minimizing the information stored in the non-volatile memory 131.

Further, as shown in FIG. 8, the on/off operation of the power supply unit 105 is no longer required after once turning on the power supply unit 105. Accordingly, the load applied to the other circuits of the self-calibrating sensor according to the on/off operation can be minimized.

[Modifications]

Incidentally, the scope of the present invention is not limited to the aforementioned embodiments but includes following modifications.

Though the self-calibrating sensor according to the aforementioned embodiments is an electro-capacitance pressure sensor, other type of sensor can also be used.

For instance, the present invention may be applied to a strain gauge sensor, or alternatively, may be applied to acceleration sensor, vibration sensor and temperature sensor etc.

In short, the present invention can be applied to any sensors as long as the sensor converts the physical amount of the workpiece into an electric signal and the calibration work is necessary between the physical amount and the electric signal.

The processor 12 of the first and the second embodiment has a fundamental arithmetic circuit 123 as well as the calibration value calculating circuit 121 and the calibration arithmetic circuit 122. However, the present invention can also be applied to self-calibrating sensor having independent calibration value calculating circuit and the calibration arithmetic circuit for obtaining the aforesaid effects of the respective embodiments.

Other arrangement of the specific structure and configuration are possible for implementing the present invention as long as the object of the present invention can be attained.

What is claimed is:

1. A self-calibrating sensor comprising:
   a sensor element for electrically detecting a change in physical amount of a workpiece;
   a signal output means for detecting the change of the sensor element and outputting an electric signal;
   a processor for conducting calibration calculation of the electric signal to adjust to the physical amount of the workpiece;
   wherein the processor includes a calibration value calculating circuit for calculating a calibration value by conducting the calibration calculation from the electric signal output by the signal output means when a known calibrating physical amount is applied to the sensor element, a calibration arithmetic circuit for obtaining a converted value of the physical amount by conducting calibration calculation based on the electric signal detected against an unknown measured physical amount by using the calibration value calculated by the calibration value calculating circuit, and a calibration completion determining circuit for determining whether the calculation of the calibration value by the calibration value calculating circuit is completed; and
   a memory for storing the calibration value from the processor,
   wherein a flag signal indicating completion of calculation of the calibration value is stored in the memory along with the calibration value, and
   wherein the calibration completion determining circuit detects the flag signal for determining whether the calculation of the calibration value is completed or not.

2. The self-calibrating sensor according to claim 1, wherein the calibrating physical amount is applied to the sensor element a plurality of times synchronized with on/off operation of a power unit for supplying electric power to the self-calibrating sensor,
   wherein the calibration value calculating circuit calculates the calibration value based on the calibrating physical amount applied the plurality of times, and
   wherein the processor has a power-on counter for providing a power-on count of the calibrating physical amount to be stored in the memory.

3. The self-calibrating sensor according to claim 2, wherein the memory includes a non-volatile memory of which stored information is not lost when the power supply unit is shut off, and wherein the calibration value, the flag signal and the power-on count is stored in the non-volatile memory.

4. The self-calibrating sensor according to claim 1, wherein the calibrating physical amount is applied to the sensor element a plurality of times for every predetermined interval from on-operation of a power supply unit supplying electric power to the self-calibrating sensor, and wherein the calibration value calculating circuit calculates the calibration value based on the calibrating physical amount applied the plurality of times.

* * * * *